(12) United States Patent
Oran

(10) Patent No.: US 7,020,771 B2
(45) Date of Patent: Mar. 28, 2006

(54) CONTROLLING DATA SECURITY PROCEDURES USING AN ADMISSION CONTROL SIGNALING PROTOCOL

(75) Inventor: David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 412 days.

(21) Appl. No.: 10/430,160

(22) Filed: May 5, 2003

(65) Prior Publication Data

US 2004/0223457 A1 Nov. 11, 2004

(51) Int. Cl.
*G06F 17/00* (2006.01)

(52) U.S. Cl. ..................... 713/153; 713/150; 713/152

(58) Field of Classification Search ................ 713/168, 713/150–152, 153
See application file for complete search history.

(56) References Cited

OTHER PUBLICATIONS

An enhanced one-bit identity authentication protocol for access control in IEEE 802.11; Wang, H.; Aravind Velayutham; Military Communications Conference, 2003. MILCOM 2003. IEEE vol. 2, Oct. 13-16, 2003 Page(s):839-843 vol. 2.*
Enhancing survivability of security services using redundancy; Hiltunen, M.A.; Schlichting, R.D.; Ugarte, C.A.; Dependable Systems and Networks, 2001. Proceedings. The International Conference on Jul. 1-4, 2001 Page(s):173-182.*
Enhancing security via stochastic routing: Bohacek, S.; Hespanha, J.P.; Obraczka, K.; Junsoo Lee; Chansook Lim; Computer Communications and Networks, 2002. Proceedings. Eleventh International Conference on Oct. 14-16, 2002 Page(s):58-62.*
B. Davie, et al., "Integrated Services in the Presence of Compressible Flows", Network Working Group, Request for Comments: 3006, Category: Standards Track, © The Internet Society 2000, ftp://ftp.rfc-editor.org/in-notes/rfc3006.txt; 13 pages, Printed Feb. 21, 2003.
Y. Bernet, "Format of the RSVP DCLASS Object", Network Working Group, Request for Comments: 2996, Category: Standards Track, © The Internet Society 2000, ftp://ftp.rfc-editor.org/in-notes/rfc2996.txt; 9 pages, Printed Feb. 10, 2003.
D. Durham, et al., "The COPS (Common Open Policy Service) Protocol", Network Working Group, Request for Comments: 2748, Category: Standards Track, © The Internet Society 2000, ftp://ftp.rfc-editor.org/in-notes/rfc2748.txt; 36 pages, Printed Feb. 10, 2003.

(Continued)

*Primary Examiner*—David Jung
(74) *Attorney, Agent, or Firm*—Baker Botts L.L.P.

(57) ABSTRACT

Providing data security involves receiving a request message at an intermediate network node. The request message is associated with a number of data packets from a communication device. The intermediate network node determines whether the request message has a satisfactory security hint. If the request message does not have a satisfactory security hint, the intermediate network node performs a security procedure on the data packets. If the request message has a satisfactory security hint, the intermediate network node relies on a security transform present in the data packets and routes the data packets without performing the security procedure.

26 Claims, 2 Drawing Sheets

OTHER PUBLICATIONS

R. Braden, et al., "Resource ReSerVation Protocol (RSVP)—Version 1 Message Processing Rules", Network Working Group, Request for Comments: 2209, Category: International, Sep. 1997, ftp://ftp.rfc-editor.org/in-notes/rfc2209.txt; 24 pages, Printed Feb. 10, 2003.

* cited by examiner

CONTROLLING DATA SECURITY PROCEDURES USING AN ADMISSION CONTROL SIGNALING PROTOCOL

TECHNICAL FIELD OF THE INVENTION

This invention relates generally to the field of telecommunications and more specifically to controlling data security procedures using an admission control signaling protocol.

BACKGROUND OF THE INVENTION

Communication networks may use multiple techniques for providing data security. These techniques may include, for example, end-to-end techniques such as Transparent Layer Security (TLS), Secure Realtime Transport Protocol (SRTP), or IPsec transport mode techniques; tunneling techniques such as IPsec tunneling mode or Layer 2 Tunneling Protocol techniques; or hop-by-hop techniques such as 802.1X or Data Over Cable Service Interface Specification (DOCSIS) techniques. The use of multiple techniques, however, may result in the application of redundant layers of data security, which in turn may waste processing cycles, bandwidth, or both. Consequently, known techniques for providing data security may be suboptimal in certain situations.

SUMMARY OF THE INVENTION

In accordance with the present invention, disadvantages and problems associated with previous techniques for providing data security may be reduced or eliminated.

According to one embodiment of the present invention, providing data security involves receiving a request message at an intermediate network node. The request message is associated with a number of data packets from a communication device. The intermediate network node determines whether the request message has a satisfactory security hint. If the request message does not have a satisfactory security hint, the intermediate network node performs a security procedure on the data packets. If the request message has a satisfactory security hint, the intermediate network node relies on a security transform present in the data packets and routes the data packets without performing the security procedure.

Certain embodiments of the invention may provide one or more technical advantages. A technical advantage of one embodiment may involve the security hint indicating a security property applied to the data packets. The security hint may reduce the application of redundant security procedures on the data packets.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
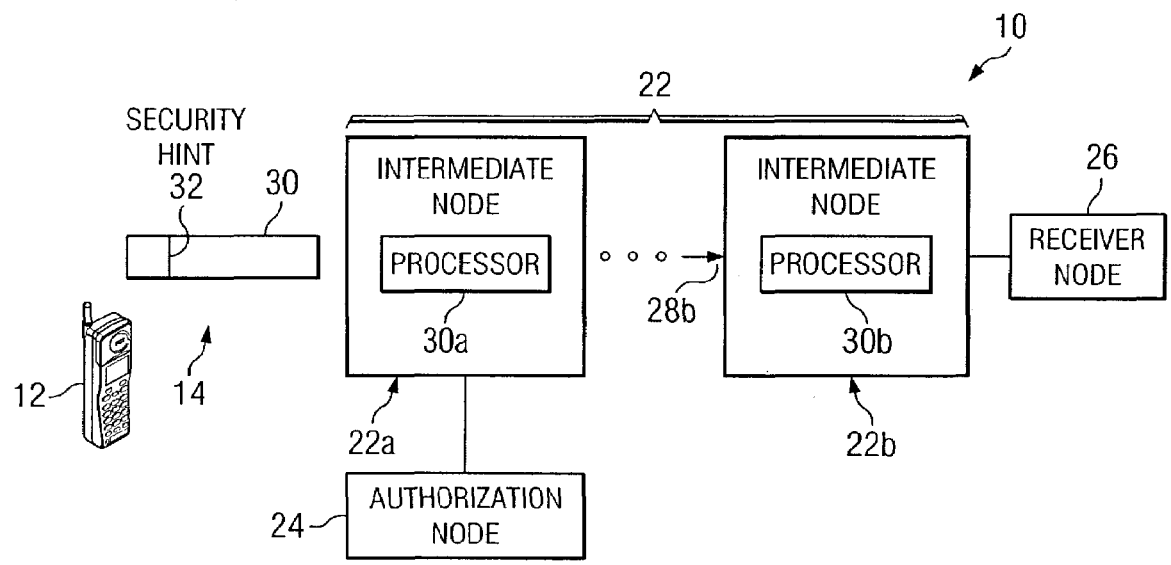
FIG. 1 is a block diagram of one embodiment of a system for providing data security in a communication network.
Figure 2:
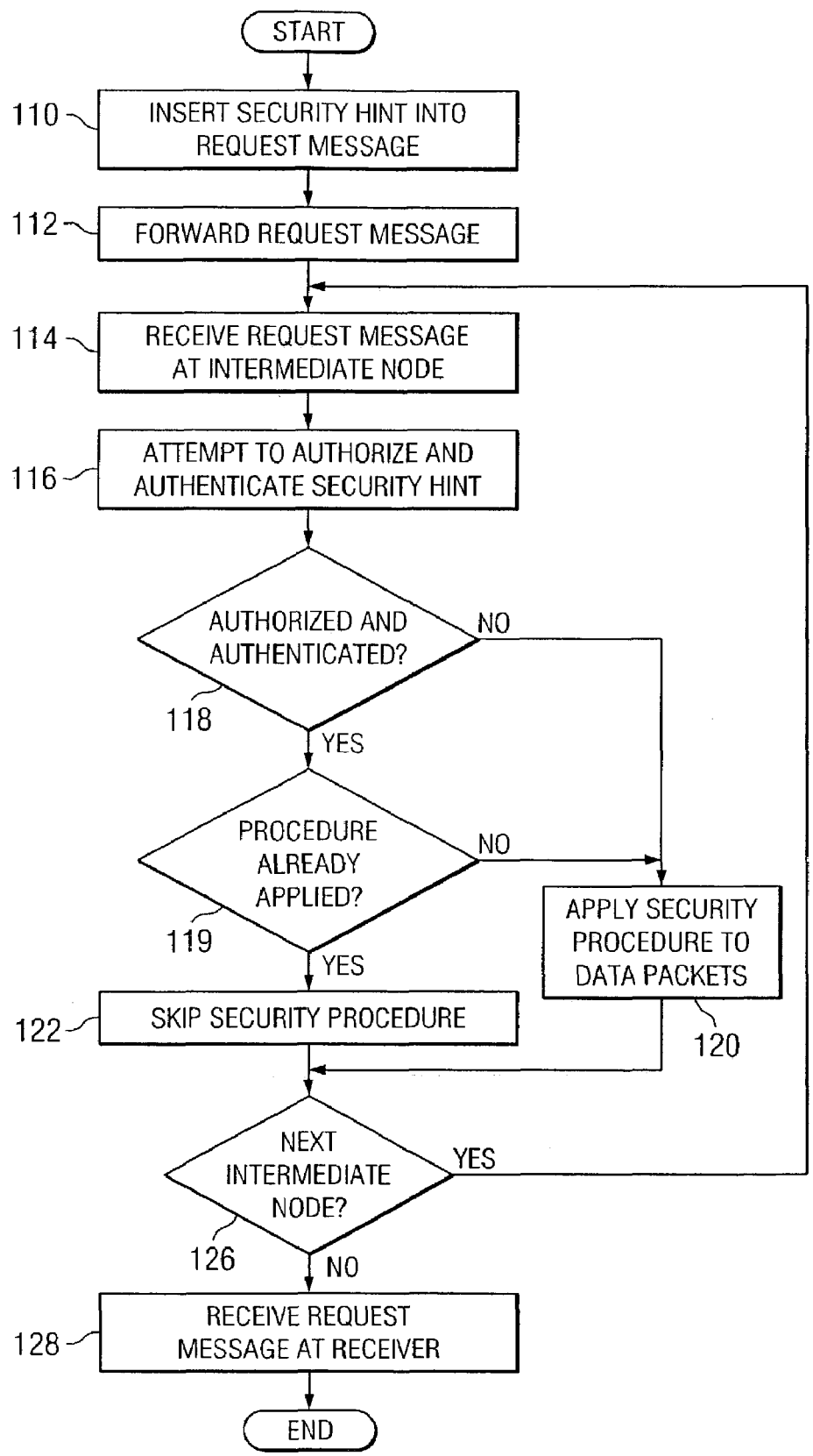
FIG. 2 is a flowchart demonstrating one embodiment of a method for providing data security in a communication network.

Embodiments of the present invention and its advantages are best understood by referring to FIGS. 1 through 3 of the drawings, like numerals being used for like and corresponding parts of the various drawings.

FIG. 1 is a block diagram of one embodiment of a system 10 for providing data security in a communication network. System 10 generates a request message that includes a security hint indicating a security property already applied to one or more data packets. Intermediate nodes use the security hint to determine whether to perform additional security procedures or to trust the security already present in the data packets. The security hint may reduce or eliminate the application of redundant security procedures on the data packets.

According to the illustrated embodiment, system 10 may provide data security for a communication network 14 that allows a communication device 12 to communicate with other networks or other devices. Communication device 12 may comprise, for example, a personal digital assistant, a cellular telephone, a mobile handset, a personal computer, or any other device suitable for communicating data packets to and from system 10. Communication device 12 may support, for example, simple Internet Protocol (IP), mobile IP, or any other suitable communication protocol, and may utilize any suitable mobile or fixed communication technology. An information stream from communication device 12 may comprise data packets communicating information such as data, video, multimedia, any other suitable type of information, or any combination of the preceding.

Communication network 14 may comprise a differentiated services network that allows Internet and other Internet Protocol-based network service providers to offer differentiated levels of service to individual customers and their information streams. Network nodes may be able to apply differentiated grades of service to various packet streams and forward them according to different behaviors. Communication network 14 may also comprise, for example, a public switched telephone network (PSTN), a public or private data network, the Internet, a wireline or wireless network, a local, regional, or global communication network, an enterprise intranet, other suitable communication link, or any combination of the preceding.

System 10 includes one or more intermediate nodes 22a–b, an authorization node 24, and a receiver node 26 coupled as shown in FIG. 1. According to one embodiment, communication device 12 performs zero or more security transforms on the packets of a stream of data to be sent. As part of gaining admission to communication network 14, communication device 12 may generate a request that describes the data flow to be sent. Communication device 12 forwards request message 30 towards one or more receiver nodes 26 through one or more intermediate nodes 22a–b.

Communication device 16 may express request message 30 according to any suitable admission control protocol such as the Resource Reservation Protocol (RSVP) or the Common Open Policy Service (COPS) protocol. The admission control protocol may be used to exchange information about resource requirements and availability, and to establish and remove resource reservations for flows of communication network 14. A flow comprises a network path associated with communication device 16, one or more intermediate nodes 22a–b, and a receiver node 26. According to one embodiment, a flow may comprise, for example, a Realtime Transport Protocol (RTP) flow that includes video streams or voice over IP, which may be protected end-to-end using Secure Realtime Transport Protocol (SRTP).

Request message 30 may include, for example, a security hint 32. Security hint 32 indicates a security property of the associated data packets that may represent a level of security to which the data packets have been subjected. For example, security hint 32 may indicate whether the associated data packets have been, for example, encrypted, or have been subjected to some other type of privacy, integrity, authentication or security measure such as cryptographic data integrity or source origin authentication.

Security hint 32 may be represented as an object type of the admission control protocol, and may itself be secured and authorized according to the authentication or authorization objects of the protocol. The authentication and authorization objects may reduce or prevent the introduction of data packets that bypass security procedures without authorization. Request message 30 may include other information such as a quality of service request, and security hint 32 may be placed in any other type of message from communication device 12 that is used to describe the data flow.

According to one embodiment, message 40 may comprise a path message, and security hint 32 may be included in a TSPEC object of the path message. An example path message with a TSPEC object is shown below:

```
<Path Message> ::= <Common Header> [<INTEGRITY>]
    <SESSION> <RSVP_HOP>
    <TIME_VALUES>
    [<POLICY_DATA> . . . ]
    [<sender descriptor>]
    <sender descriptor>  ::=  <SENDER_TEMPLATE> <SENDER_TSPEC>
        <security hint>
        [<ADSPEC>]
```

Message 40, however, may comprise any message suitable for transporting security hint 32 from communication device 12 to receiver node 26.

Intermediate nodes 22a–b make admission control and resource allocation decisions based on, among other things, request message 30, and may comprise a protocol-aware network element such as a policy enforcement point or an admission control agent. In response to receiving request message 30, intermediate nodes 22a–b may reconfigure themselves to meet restrictions designated by request message 30. Intermediate nodes 22a–b have inputs 28a–b operable to receive request message 30 and processors 30a–b operable to process request message 30.

Intermediate nodes 22a–b determine whether to apply a security procedure in response to security hint 32 of request message 30. For example, security hint 32 may indicate that the data packets of request message 30 have been encrypted, so intermediate nodes 22a–b need not perform additional encryption. To apply security measures, an intermediate node 22a–b may perform packet classification by examining security hint 32 to determine how to classify the data packets for security purposes. For example, packets may be directed to a flow that comprises an end-to-end protective bypass rather than an IPsec virtual private network (VPN) tunnel based on security hint 32.

If an intermediate node 22a–b does not recognize security hint 32, intermediate node 22a–b may ignore security hint 32 and leave security hint 32 intact in the object that is forwarded. Alternatively, intermediate node 22a–b may send an error message to communication device 12. In response, communication device 12 may determine that security hint 32 is the cause of the problem, and send a new request message 30 that does not include security hint 32.

Examples of intermediate nodes 22a–b may include, for example, a serving support node or a gateway support node. A serving support node performs mobility management functions such as mobile subscriber attach/detach for communication devices 12 within its service area. A gateway support node acts as an interface to a communication network, and creates a PDP context that allows communication device 12 to access a communication network. The gateway support node routes data packets from the communication network to the serving support node, which sends the data packets to communication device 12.

Authorization node 24 may be used to authenticate and authorize security hint 32 of request message 30, which may prevent unprotected data packets from passing through system 10 without encryption. Authorization node 24 may also perform other security procedures such as authorization of the user of communication device 12. Authorization node 24 may be implemented as a remote access dial-in user service (RADIUS) server, a DIAMETER server, a COPS server, or other suitable client/server, and may use a client/server-base authentication software system. Intermediate node 22a may act as a client of the software system.

Receiver node 26 receives request message 30 and processes the request in order to attempt to admit the flow and provide the requested resources. Receiver node 26 confirms the flow by sending reservation messages through communication network 14. The reservation messages may describe the bandwidth characteristics of the data to be received from communication device 12. As the reservation messages propagate back toward communication device 12, intermediate nodes 22a–b determine whether or not to accept the proposed reservation and to commit resources. If an affirmative decision is made, intermediate nodes 22a–b commit the resources, and the reservation messages are propagated to the next node.

Modifications, additions, or omissions may be made to system 10 without departing from the scope of the invention. For example, system 10 may include more or fewer intermediate nodes 22a–b. Moreover, the operation of the system may be performed by more or fewer modules. For example, the operation of intermediate node 22a and intermediate node 22b may be performed by one module, or the operation of intermediate node 22a may be performed by more than one module. Additionally, functions may be performed using any suitable logic comprising software, hardware, other logic, or any suitable combination of the preceding. As used in this document, "each" refers to each member of a set or each member of a subset of a set.

System 10 may provide for more efficient data security than known techniques. A known technique may involve identifying relevant traffic according to a heuristic classification. Heuristic classifications, however, are typically prone to failure. Application layer gateways may be used to identify control data to determine if the data packets have been encrypted, or application-specific signaling proxies or back-to-back user agents may be used to handle traffic at the application level. System 10, however, does not require additional mechanisms such as application layer gateways, application-specific signaling proxies, or back-to-back user agents. An additional protocol for controlling packet classification from a separate box may be used. System 10, however, uses existing flow admission and classification techniques, and does not require additional protocols.

FIG. 2 is a flowchart illustrating one embodiment of a method for providing data security. The method begins at step 110. Communication device 12 determines a security property of the data packets and inserts security hint 32 into request message 30 at step 110 that indicates the determined security property. Security hint 32 may indicate that, for example, the data packets have been encrypted.

Communication device 12 forwards request message 30 at step 112. An intermediate node 22a–b receives request message 30 at step 114. Intermediate node 22a–b may comprise a policy enforcement point, an admission control agent, or both. Intermediate node 22a–b attempts to authorize and authenticate security hint 32 at step 116. Authorization node 24 may be used to attempt to authorize and authenticate security hint 32.

If security hint 32 is not authorized and authenticated at step 118, the method proceeds to step 120, where a security procedure is applied to the data packets. The security procedure may comprise, for example, an encryption procedure. If security hint 32 is authorized and authenticated at step 118, the method proceeds to step 119, where the security hint is checked to determine whether the security procedure has been applied to the data packets. If the procedure has not been applied, the method proceeds to step 120. If the procedure has been applied, the method proceeds to step 122, where the security procedure is skipped.

If there is a next intermediate node at step 126, the method returns to step 114, where request message 30 is received at the next intermediate node 22a–b. If thee is no next intermediate node 22a–b at step 126, the method proceeds to step 128. Receiver node 26 receives request message 30 at step 128. In response to receiving request message 30, receiver node 26 may grant admission to the data packets and send a reservation message to communication device 12. After receiving request message 30, the method terminates.

Modifications, additions, or omissions may be made to the method without departing from the scope of the invention. For example, only authorization or authentication may be performed at step 116. Additionally, steps may be performed in any suitable order without departing from the scope of the invention.

Although an embodiment of the invention and its advantages are described in detail, a person skilled in the art could make various alterations, additions, and omissions without departing from the spirit and scope of the present invention as defined by the appended claims.

What is claimed is:

1. A method for providing data security, comprising:
   receiving a request message at an intermediate network node from a communication device, the request message associated with a plurality of data packets;
   determining whether the request message is associated with a satisfactory security hint;
   performing a security procedure on the data packets if the request message is not associated with a satisfactory security hint; and
   relying on a security transform present in the data packets and routing the data packets without performing the security procedure if the request message is associated with a satisfactory security hint in order to provide data security.

2. The method of claim 1, wherein the security procedure comprises an encryption procedure.

3. The method of claim 1, wherein the security procedure comprises a cryptographic data integrity procedure.

4. The method of claim 1, wherein the security procedure comprises a source origin authentication procedure.

5. The method of claim 1, wherein determining whether the request message is associated with a satisfactory security hint comprises:
   performing an authorization procedure for the security hint; and
   determining that the security hint is satisfactory if the security hint satisfies the authorization procedure.

6. The method of claim 1, wherein the security hint describes one or more security transforms that have been applied to the data packets.

7. The method of claim 1, wherein the security hint is expressed according to a flow-based admission control protocol.

8. The method of claim 1, wherein the request message comprises a request selected from a group consisting of a resource request and an admission request.

9. A system for providing data security, comprising:
   an input operable to receive a request message from a communication device, the request message associated with a plurality of data packets; and
   a processor coupled to the input and operable to:
      determine whether the request message is associated with a satisfactory security hint;
      perform a security procedure on the data packets if the request message is not associated with a satisfactory security hint; and
      rely on a security transform present in the data packets and route the data packets without performing the security procedure if the request message is associated with a satisfactory security hint in order to provide data security.

10. The system of claim 9, wherein the security procedure comprises an encryption procedure.

11. The system of claim 9, wherein the security procedure comprises a cryptographic data integrity procedure.

12. The system of claim 9, wherein the security procedure comprises a source origin authentication procedure.

13. The system of claim 9, wherein the processor is operable to determine whether the request message is associated with a satisfactory security hint by:
   performing an authorization procedure for the security hint; and
   determining that the security hint is satisfactory if the security hint satisfies the authorization procedure.

14. The system of claim 9, wherein the security hint describes one or more security transforms that have been applied to the data packets.

15. The system of claim 9, wherein the security hint is expressed according to a flow-based admission control protocol.

16. The system of claim 9, wherein the request message comprises a request selected from a group consisting of a resource request and an admission request.

17. Logic for providing data security, the logic embodied in a medium and operable to:
   receive a request message at an intermediate network node from a communication device, the request message associated with a plurality of data packets;
   determine whether the request message is associated with a satisfactory security hint;
   perform a security procedure on the data packets if the request message is not associated with a satisfactory security hint; and
   rely on a security transform present in the data packets and route the data packets without performing the security procedure if the request message is associated with a satisfactory security hint in order to provide data security.

18. The logic of claim 17, wherein the security procedure comprises an encryption procedure.

19. The logic of claim 17, wherein the security procedure comprises a cryptographic data integrity procedure.

20. The logic of claim 17, wherein the security procedure comprises a source origin authentication procedure.

21. The logic of claim 17, operable to determine whether the request message is associated with a satisfactory security hint by:
performing an authorization procedure for the security hint; and
determining that the security hint is satisfactory if the security hint satisfies the authorization procedure.

22. The logic of claim 17, wherein the security hint describes one or more security transforms that have been applied to the data packets.

23. The logic of claim 17, wherein the security hint is expressed according to a flow-based admission control protocol.

24. The logic of claim 17, wherein the request message comprises a request selected from a group consisting of a resource request and an admission request.

25. A system for providing data security, comprising:
means for receiving a request message at an intermediate network node from a communication device, the request message associated with a plurality of data packets;
means for determining whether the request message is associated with a satisfactory security hint;
means for performing a security procedure on the data packets if the request message is not associated with a satisfactory security hint; and
means for relying on a security transform present in the data packets and routing the data packets without performing the security procedure if the request message is associated with a satisfactory security hint in order to provide data security.

26. A method for providing data security, comprising:
receiving a request message at an intermediate network node from a communication device, the request message associated with a plurality of data packets, the request message comprising a request selected from a group consisting of a resource request and an admission request;
determining whether the request message is associated with a satisfactory security hint by:
performing an authorization procedure for the security hint; and
determining that the security hint is satisfactory if the security hint satisfies the authorization procedure, the security hint expressed according to a flow-based admission control protocol;
performing a security procedure on the data packets if the request message is not associated with a satisfactory security hint, the security procedure comprising an encryption procedure, a cryptographic data integrity procedure, and a source origin authentication procedure; and
relying on a security transform present in the data packets and routing the data packets without performing the security procedure if the request message is associated with a satisfactory security hint in order to provide data security.

* * * * *